United States Patent [19]
Wang

[11] Patent Number: 5,894,467
[45] Date of Patent: Apr. 13, 1999

[54] MULTIPLE VSEL ASSEMBLY FOR READ/WRITE AND TRACKING APPLICATIONS IN OPTICAL DISKS

[75] Inventor: Shih-Yuan Wang, Palo Alto, Calif.

[73] Assignee: Hewlett-Packard Company, Palo Alto, Calif.

[21] Appl. No.: 08/808,950

[22] Filed: Feb. 19, 1997

[51] Int. Cl.[6] .................................................. G11B 7/00
[52] U.S. Cl. .................................... 369/121; 369/116
[58] Field of Search .................................. 369/121, 120, 369/122, 116, 44.11, 44.12, 44.14, 44.37, 44.38, 44.41

[56] References Cited

U.S. PATENT DOCUMENTS 5,619,521  4/1997  Tanaka .................. 369/44.37 X
5,715,227  2/1998  Matsumoto ............. 369/44.37 X
5,757,741  5/1998  Jiang et al. ............ 369/44.12

Primary Examiner—Muhammad N. Edun

[57] ABSTRACT

A read/write head assembly for use in optical disk drives and the like. The head assembly includes multiple vertical surface emitting lasers (VSELs) for reading and writing the optical disk. The reading and writing functions are provided by different VSELs. The VSELs are constructed on a common substrate together with one or more photodetectors for detecting light reflected from the disk. Multiple reading assemblies, each comprising a photodetector and VSEL, may be implemented on the same substrate thereby increasing the rate at which data may be read from the disk. In addition, multiple VSELs for writing the disk may be implemented on the common substrate thereby increasing the rate at which data is written to the disk.

8 Claims, 4 Drawing Sheets

MULTIPLE VSEL ASSEMBLY FOR READ/WRITE AND TRACKING APPLICATIONS IN OPTICAL DISKS

FIELD OF THE INVENTION

The present invention relates to optical disks, and more particularly, to an improved read/write laser assembly for use therein.

BACKGROUND OF THE INVENTION

Optical disks that may be written once have gained wide acceptance as a means of backing up data and custom publishing. These drives use a relatively high power laser to damage the surface of a blank disk during the writing operation. The data is read by detecting the reflectivity of the disk surface utilizing a low power laser and optical detector for detecting the fraction of the light reflected by the disk surface. The disks are read with the aid of two or more low power lasers, one for reading the data bits and the others for detecting track data that is used to position the reading laser. The various beams are generated from a single high power laser by a beam splitter or equivalent optical structure.

The power needed to write the disk is typically of the order of 10 mW. The power needed for the reading operations is only of the order of 1 mW. However, to accommodate the losses inherent in the beam splitter, the high power laser must be typically 30 mW. Lasers in this power range are difficult to construct.

To provide a high power laser in the 30 mW range, edge emitting laser technology must be utilized. The single edge emitting laser is then aligned with the beam splitter and the detectors used for tracking and reading.

The need to employ edge emitting laser technology and the need to provide some form of alignment mechanism substantially increases the cost of read/write optical disks and limits the read/write mechanism to a single "head" which can operate only on one track at a time.

One drawback of optical disks has been their slow speed compared to conventional magnetic disk drives. In principle, this drawback could be overcome by using multiple read/write heads. However, the cost of the heads based on single edge emitting lasers together with the need to align the heads with respect to one another, has made such systems commercially unattractive.

Broadly, it is the object of the present invention to provide an improved read/write head for use in optical disks.

It is a further object of the present invention to provide a read/write head that may be constructed without reliance on edge emitting lasers.

It is a still further object of the present invention to provide a read/write head that can read and/or write multiple tracks on an optical disk at the same time.

These and other objects of the present invention will become apparent to those skilled in the art from the following detailed description of the invention and the accompanying drawings.

SUMMARY OF THE INVENTION

The present invention is a read/write head assembly for use in optical disk drives and the like. The head assembly includes multiple vertical surface emitting lasers (VSELs) for reading and writing the optical disk. The reading and writing functions are provided by different VSELs. The VSELs are constructed on a common substrate together with one or more photodetectors for detecting light reflected from the disk. Multiple reading assemblies, each comprising a photodetector and VSEL, may be implemented on the same substrate thereby increasing the rate at which data may be read from the disk. In addition, multiple VSELs for writing the disk may be implemented on the common substrate thereby increasing the rate at which data is written to the disk.

DETAILED DESCRIPTION OF THE INVENTION

Figure 1:
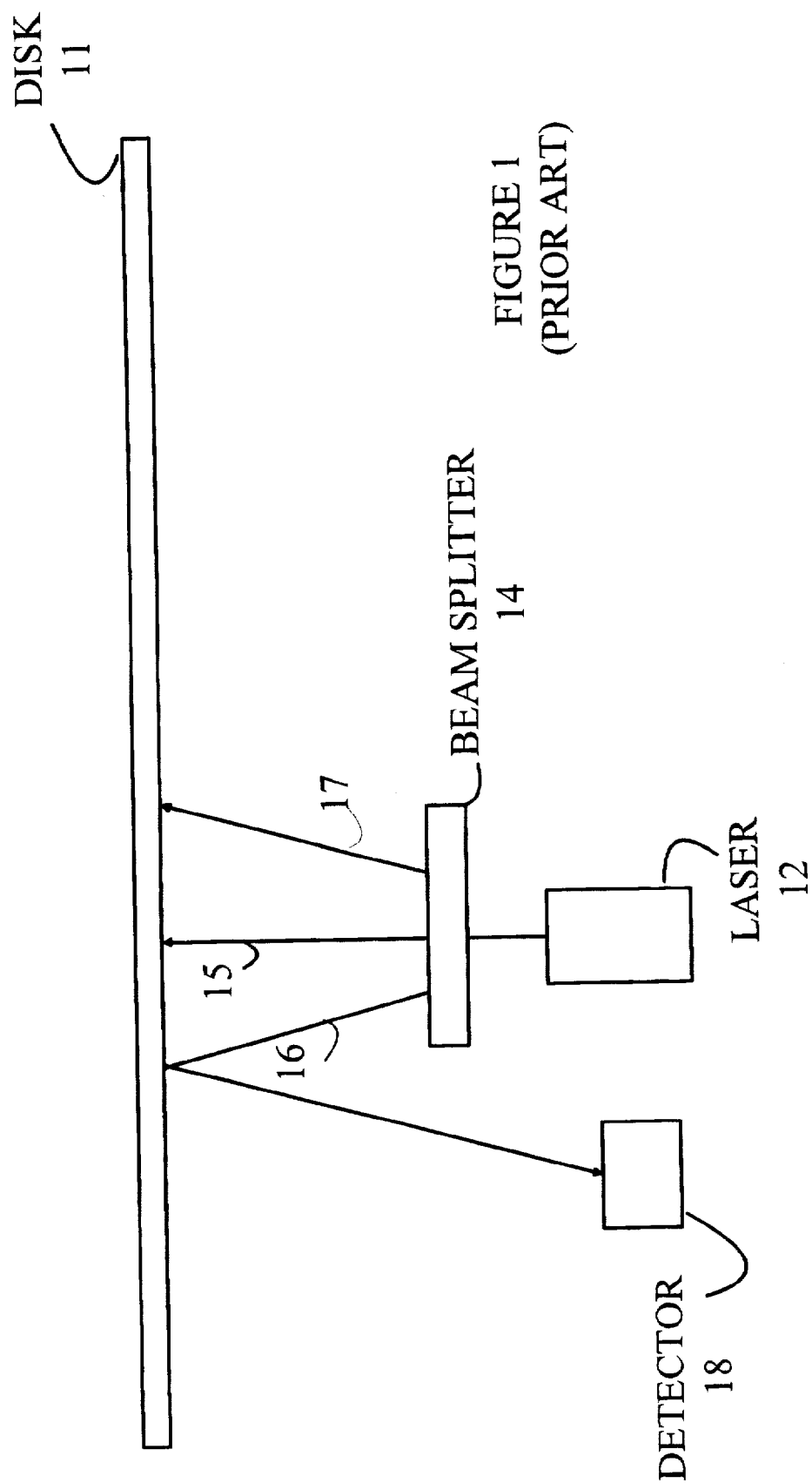
FIG. 1 is a schematic drawing of a typical prior art read/write optical disk assembly.

The present invention may be more easily understood with reference to FIG. 1 which is a schematic drawing of a typical prior art read/write optical disk assembly. Data is written or read from a disk 11 with the aid of one of the beams generated from laser 12 via beam splitter 14. Beam 15 is a high power beam utilized for writing disk 11. Beam 16 provides the light source for detector 18 which reads data from disk 11. Beam 17 is used to read track position data. The detector corresponding to beam 17 has been omitted from the drawing.

As noted above, beam 15 requires about 10 mW. To obtain this power from a single laser 12 via a beam splitter, laser 12 must have an output power of the order of 30 mW. This power level can only be achieved economically by utilizing an edge emitting laser. Such lasers cannot be conveniently fabricated in arrays or on a single circuit chip which also includes the detectors needed by beams 16 and 17. As a result, the various components must be separately fabricated and mounted on some form of assembly which assures that the components are properly aligned with one another.

The present invention is based on the observation that the power required to write the disk, i.e., 10 mW, is within the range available from vertical surface emitting lasers (VSELs); whereas, the total power of 30 mW required by prior art devices is not. Hence, if multiple lasers are utilized for the various functions currently derived from a single high power laser, the multiple laser assembly can be constructed on a single integrated circuit substrate. In addition to providing a more economical laser assembly, an assembly based on VSELs has components that are inherently aligned with respect to one another. Hence, the cost of aligning the various components is eliminated. Finally, detectors may be fabricated on the same substrate as the lasers thereby providing a read/write disk head on a single integrated circuit substrate at a fraction of the cost of the edge emitting laser currently used to construct the disk heads.

Figure 2:
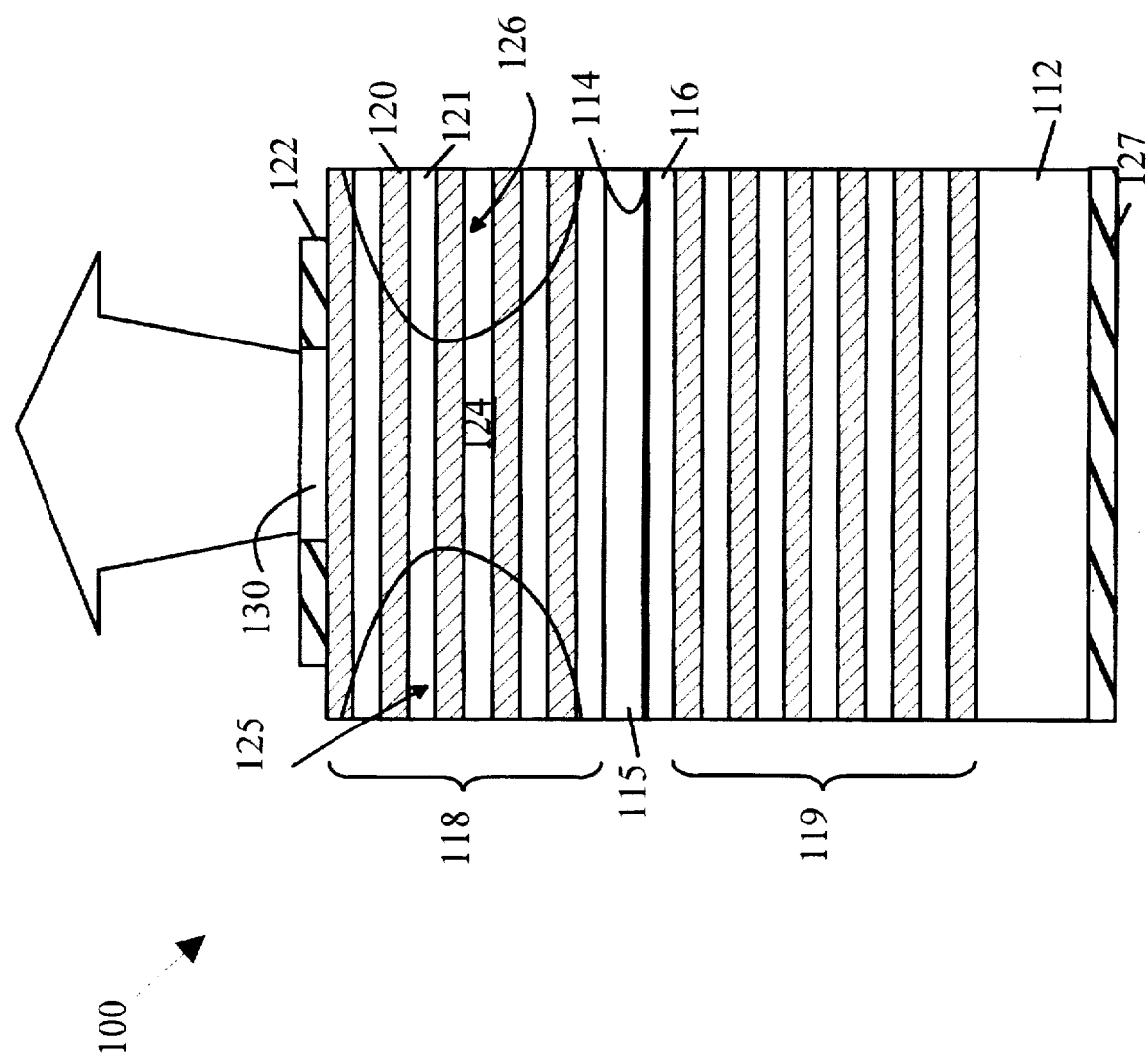
FIG. 2 is a cross-section of a typical VSEL.

A typical VSEL is shown in FIG. 2 which is a cross-sectional view of a conventional VSEL 100. Since construction of VSELs is well known to those skilled in the laser arts, it will not be described in detail here. For the purpose of this discussion, it is sufficient to note that VSEL 100 may be viewed as a p-i-n diode having a top mirror region 18, a light generation region 114, and bottom mirror region 119. These regions are constructed on a substrate 112. Electrical power is applied between electrodes 122 and 127. The various layers are constructed by epitaxial growth.

The active region is typically constructed from one or more quantum wells of InGaP or AlInGaP which is separated from mirror regions 118 and 119 by spacers 115 and 116, respectively. The choice of material depends on the desired wavelength of the light emitted by the VSEL. In addition, devices based on bulk active regions are known to the art. This layer 114 may be viewed as a light generation layer which generates light due to spontaneous and stimulated emission via the recombination of electrons and holes generated by forward biasing the p-i-n diode.

The mirror regions are constructed from alternating layers of which layers 120 and 121 are typical. These layers have different indices of refraction. The thickness of each layer is chosen to be one quarter of the wavelength of the light. The stacks form Bragg mirrors. The stacks are typically constructed from alternating layers of AlAs and AlGaAs. To obtain the desired reflectivity, 30 periods are typically required. The layers in the upper mirror region 118 are typically doped to be p-type semiconductors and those in the lower mirror region 119 are doped to be n-type semiconductors. Substrate 112 is preferably n-type. Bottom electrode 127 is preferably an n-ohmic contact. However, n-i-p diode structures may also be constructed by growing the structures on a p-substrate or a semi-insulating substrate with a p-layer deposited thereon.

The current flow between electrodes 122 and 127 is confined to region 124 by implanting regions 125 and 126 to convert the regions to regions of high resistivity. This is typically accomplished by implanting with hydrogen ions.

It should be noted that VSEL 100 is not shown to scale in FIG. 2. In particular, the mirror regions and active regions have been expanded to provide clarity in the drawing. In practice, the thickness of region 112 is typically 150 µm compared to about 10 µm for the mirror and active regions. Window 130 in top electrode 122 is approximately 3–6 µm in diameter while bottom electrode 127 covers the bottom of the substrate.

Figure 3:
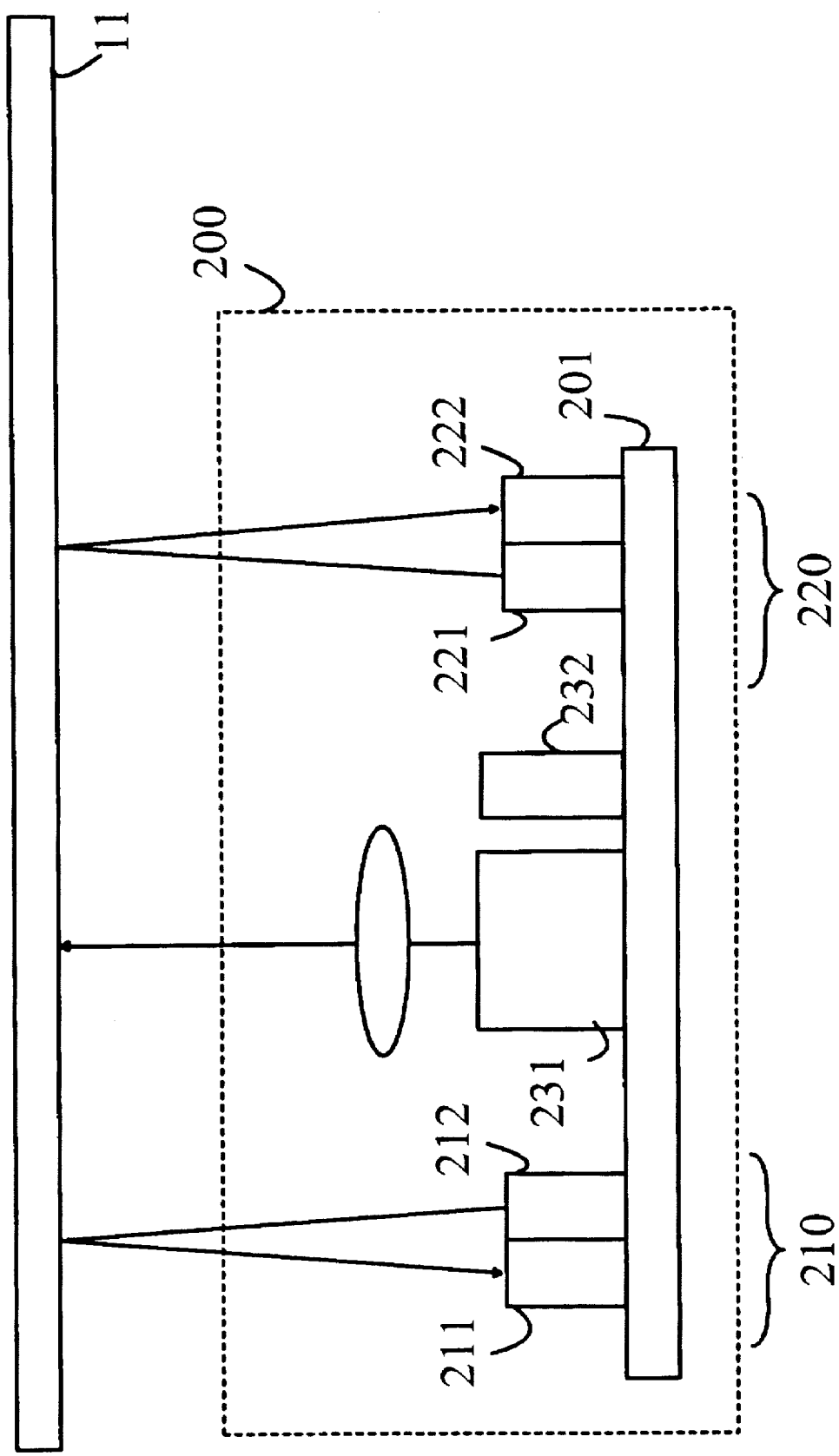
FIG. 3 is a block diagram of a read/write assembly according to the present invention.

Refer now to FIG. 3 which is a block diagram of a read/write head 200 according to the present invention for reading and writing an optical disk 11. The various components of read/write head 200 are constructed on a substrate 201. Read/write head 200 includes two reading assemblies shown at 210 and 220, and a write laser 231. An optional write detector 232 is also shown in the drawing for monitoring the position or power or write laser 231. Each read assembly includes a laser and one or more photodetectors for measuring the intensity of the laser output that is reflected back from disk 11. The laser and detectors corresponding to assembly 210 are shown at 211 and 212, respectively. The laser and detectors corresponding to assembly 220 are shown at 221 and 222, respectively.

The lasers that are included in head 200 are constructed as VSELs. The detectors may be conventional photo-diodes. As noted above, the detectors and lasers are fabricated on substrate 201 using conventional integrated circuit fabrication techniques that assure that the various assemblies are properly positioned with respect to one another. This inherent alignment facilitates the fabrication of read/write heads that operate on a plurality of tracks at one time.

While optical disks provide economical non-volatile storage, the speed with which these devices read, and particularly write, remains a significant impediment to the use of optical disks for primary data storage. One method for increasing the effective speed of these drives is to read or write several tracks at one time. Such arrangements require precision alignment of the read and/or write lasers with respect to one another. Since the present invention inherently provides this alignment, the present invention is ideally suited for constructing such read/write heads.

Figure 4:
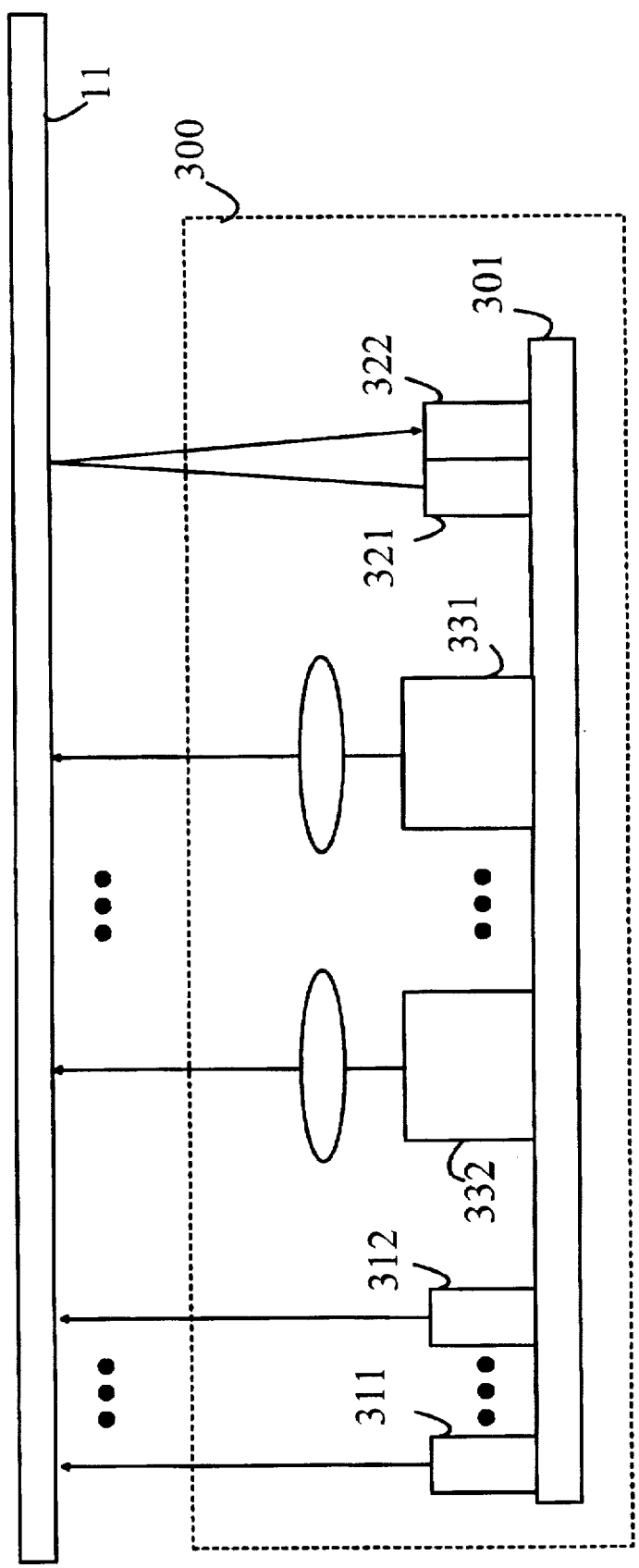
FIG. 4 is a block diagram of a second embodiment of a read/write assembly according to the present invention.

A block diagram of a read/write head 300 having multiple read and write lasers is shown at 300 in FIG. 4. Head 300 includes a plurality of read assemblies of which assemblies 311 and 312 are exemplary. Each read assembly includes one VSEL laser and one or more photodetectors. The read assemblies are preferably positioned such that each read assembly reads data from a different track than the other read assemblies.

Head 300 also includes a plurality of VSELs with sufficient power to write the surface of disk 11. Exemplary write lasers are shown at 332 and 333. The write lasers may be positioned such that they write different bits if turned on at the same time. The bits are preferably on different tracks; however, arrangements in which multiple bits are written on the same track are also possible.

In addition, head 300 includes an additional read assembly comprising laser 321 and photodetector 322 for reading track position data from disk 11. The various photodetectors and lasers are constructed on a common substrate 301.

Various modifications to the present invention will become apparent to those skilled in the art from the foregoing description and accompanying drawings. Accordingly, the present invention is to be limited solely by the scope of the following claims.

What is claimed is:

1. A read/write head assembly comprising:

a first write VSEL having a power level sufficient to write an optical disk;

a first read VSEL; and a first photodetector for detecting light generated by said first read VSEL and reflected from said optical disk, wherein said first write VSEL and first read VSEL and said first photodetector are constructed on a common substrate.

2. The read/write head assembly of claim 1 further comprising a second read VSEL and a second photodetector for detecting light generated by said second read VSEL and reflected from said optical disk, said second read VSEL and said second photodetector being constructed on said common substrate, wherein said second read VSEL and said second photodetector are positioned to read data from a second track on said optical disk when said first photodetector and said first read VSEL are positioned to read data from a first track, said first track being different from said second track.

3. The read/write assembly of claim 1 further comprising a position data VSEL and a position data photodetector for detecting light generated by said position data VSEL and reflected from said optical disk, said position data VSEL and said position data photodetector being constructed on said common substrate, wherein said position data VSEL and said position data photodetector are positioned to read track position data when said first read VSEL and said first photodetector are positioned to read data from a track on said optical disk.

4. The read/write assembly of claim 1 further comprising a second write VSEL having a power level sufficient to write said optical disk, said second write VSEL being positioned such that said second write VSEL writes a different bit location on said optical disk than said first write VSEL when said first write and second write VSELs are turned on at the same time.

5. A method for reading and writing an optical disk, said method comprising the steps of:

providing a first write VSEL having a power level sufficient to write said optical disk for writing said optical disk;

providing a first read VSEL; and a first photodetector for detecting light generated by said first read VSEL and reflected from said optical disk for reading said optical disk, wherein said first write and first read VSELs and said first photodetector are constructed on a common substrate.

6. The method of claim 5 further comprising the step of providing a second read VSEL and a second photodetector for detecting light generated by said second read VSEL and reflected from said optical disk, said second read VSEL and said second photodetector being constructed on said common substrate, wherein said second read VSEL and said second photodetector are positioned to read data from a second track on said optical disk when said first photodetector and said first read VSEL are positioned to read data from a first track, said first track being different from said second track.

7. The method of claim 5 further comprising the step of providing a position data VSEL and a position data photodetector for detecting light generated by said position data VSEL and reflected from said optical disk, said position data VSEL and said third photodetector being constructed on said common substrate, wherein said position data VSEL and said position data photodetector are positioned to read track position data when said first write VSEL and said first photodetector are positioned to read data from a track on said optical disk.

8. The method of claim 5 further comprising the step of providing a second write VSEL having a power level sufficient to write said optical disk, said second write VSEL being positioned such that said second write VSEL writes a different bit location on said optical disk than said first write VSEL when said first write and second write VSELs are turned on at the same time.

* * * * *